(12) United States Patent
Noda

(10) Patent No.: US 7,305,657 B2
(45) Date of Patent: Dec. 4, 2007

(54) WEB SERVER HAVING FUNCTION OF JAVA SERVLET, METHOD FOR UPDATING JAVA PROGRAM AND COMPUTER PROGRAM

(75) Inventor: Toru Noda, Osaka (JP)

(73) Assignee: Fujitsu Limited, Kawasaki (JP)

( * ) Notice: Subject to any disclaimer, the term of this patent is extended or adjusted under 35 U.S.C. 154(b) by 776 days.

(21) Appl. No.: 10/647,310

(22) Filed: Aug. 26, 2003

(65) Prior Publication Data

US 2004/0064822 A1 Apr. 1, 2004

(30) Foreign Application Priority Data

Aug. 28, 2002 (JP) ............... 2002-249266

(51) Int. Cl.
*G06F 9/44* (2006.01)
*G06F 3/00* (2006.01)
*G06F 15/00* (2006.01)
(52) U.S. Cl. ............... 717/106; 717/108; 717/110; 715/760; 715/513
(58) Field of Classification Search ........ 717/100–118; 719/219, 311, 246; 715/501.1, 513, 505–508, 715/760
See application file for complete search history.

(56) References Cited

U.S. PATENT DOCUMENTS 6,654,949 B1 * 11/2003 Fraenkel et al. ............ 717/130

2001/0037490 A1 * 11/2001 Chiang ............... 717/2
2001/0047402 A1 * 11/2001 Saimi et al. ............... 709/219
2006/0074683 A1 * 4/2006 Betarbet ............... 704/270.1

FOREIGN PATENT DOCUMENTS

EP 1 139 216 A2 10/2001
JP 2001-344105 12/2001

* cited by examiner

Primary Examiner—Lewis A. Bullock, Jr.
Assistant Examiner—Insun Kang
(74) Attorney, Agent, or Firm—Staas & Halsey LLP

(57) ABSTRACT

A Web server storing a Java program for generating an HTML file of a Web page includes a portion for obtaining an HTML file, a first conversion portion for converting the file into Java codes, a portion for replacing the codes with a part of a Java program related to the Web page structure, the Java program being for generating the HTML file, a portion for extracting Java codes of a part related to a designated Web page structure, a second conversion portion for converting the codes into an HTML file, and a portion for transmitting the file to the terminal device. If the HTML file contains a tag indicating an unmodifiable part, the first conversion portion converts the tag into a Java code indicating an unmodifiable part. The second conversion portion converts the code contained in the Java codes into the tag.

5 Claims, 16 Drawing Sheets

FIG.5

```
<HTML>
<HEAD>
<TITLE>Sample Login:GID01</TITLE>
<META HTTP-EQUIV="Content-Style-Type" CONTENT="text/css">
<LINK rel="stylesheet" type="text/css" href="test.css">

<X name="JAVASCRIPT_PARAM">
<SCRIPT language="JavaScript">
<!--
 var loginError = 0;
//-->
</SCRIPT>
</X>
         ——— OMISSION ———
</HEAD>
<BODY BGCOLOR="#E0E0F0" onload="Javascript:init()">
<CENTER>
<BR>
<B><H3>FUJITSU Login(GID01)</H3></B>
<BR>
<BR>
<FORM name="form1" method="post" action="App">
  <INPUT type="hidden" name="GID" value="GID01">
  <INPUT type="hidden" name="SCENE" value="1">
  <TABLE>
   <TR>
     <TD>User ID</TD>
     <TD><INPUT type="text" name="USER_ID" value="<X=USER_ID=X>"></TD>
   </TR>
   <TR>
     <TD>PassWord</TD>
     <TD><input type="password" name="PassWord"></TD>
   </TR>
   <TR>
     <TD></TD>
     <TD align="right">
     <input type="button" name="sub" value=" OK " disabled="true" onclick="javascript:goNext();">
     </TD>
   </TR>
  </TABLE>
</FORM>
</CENTER>
<BR>
</BODY>
</HTML>
```

FIG. 6

```
package xx.xx.fks.sample;

import java.io.*;
import java.lang.*;
import java.util.*;
import xx.xx.fks.paf.core.*;

public class GID01Document extends Document
{
  public void init(){
  }
  protected void _editDocHeader()
  {
    ——— OMISSION ———

_editLine("<BR>");
    _editLine("<B><H3>Login(GID01)</H3></B>");
    _editLine("<BR>");
    _editLine("<BR>");
    _editLine("<FORM name=¥"form1¥" method=¥"post¥" action=¥"" + getActionPath() + "App¥">");
    _editLine("<INPUT type=¥"hidden¥" name=¥"GID¥" value=¥"GID01¥">");
    _editLine("<INPUT type=¥"hidden¥" name=¥"SCENE¥" value=¥"1¥">");
    _editLine("<TABLE>");
    _editLine("<TR>");
    _editLine("<TD>");
    _editLine("User ID");
    _editLine("</TD>");
    _editLine("<TD>");
    _editLine("<INPUT type=¥"text¥" name=¥"USER_ID¥" value=¥"" +getHTML("USER_ID")+"¥">");

——— OMISSION ———

_editLine("</HTML>");
  }
}
```

```
<HTML>
<HEAD><TITLE>
ADDRESS DISPLAY SCREEN
</TITLE></HEAD>
<BODY>
ADDRESS : OSAKA PREFECTURE
</BODY>
</HTML>
```

```
<HTML>
<HEAD><TITLE>
ADDRESS DISPLAY SCREEN
</TITLE></HEAD>
<BODY>
ADDRESS : <X name="ADDRESS">OSAKA PREFECTURE</X>
</BODY>
</HTML>
```

FIG.15

```
<HTML>
<HEAD><TITLE>
ADDRESS DISPLAY SCREEN
</TITLE></HEAD>
<BODY BGCOLOR="#AAEEBB">
<CENTER>
<TABLE border="1"><TR><TD>
<FONT size="6">
★ USER INFORMATION ★
</FONT>
</TD></TR></TABLE>
</CENTER><BR>
YOUR ADDRESS IS AS FOLLOWS. <BR>
PLEASE CHECK. <BR>
<HR color="#0000FF">
<FONT size="8"><CENTER>
<X name="ADDRESS"> OSAKA PREFECTURE </X>
</CENTER></FONT>
<HR color="#0000FF">
<TABLE width="100%">
<TR><TD align="right">
<IMG src="fujitsu.gif" height="50"><BR><BR>
<FONT size="2"><B>2002 FUJITSU LIMITED </B></FONT>
</TD></TR>
</TABLE>
</BODY>
</HTML>
```

WEB SERVER HAVING FUNCTION OF JAVA SERVLET, METHOD FOR UPDATING JAVA PROGRAM AND COMPUTER PROGRAM

BACKGROUND OF THE INVENTION

1. Field of the Invention

The present invention relates to a modification to a Java program for a Web server that has a function of a Java servlet.

2. Description of the Prior Art

One of Java (a trademark of Sun Microsystems, Inc. in the U.S.A.) technologies that are program languages of Sun Microsystems, Inc. is the Java servlet that is used for a Web server. When executing a program using a Java servlet, a hypertext that is an HTML file written by a hypertext markup language (HTML), i.e., a description language for displaying a Web page responding to a request from a World Wide Web browser (a WWW browser) can be generated, and the hypertext can be transmitted to the WWW browser.

This program includes mainly business logic, screen generation (drawing) logic and control logic. The business logic performs an application process such as user authentication. The screen generation logic is related to a structure such as Web page designing and generates an HTML file in accordance with a result of the process by the business logic. Therefore, performing this program can generate an HTML file for displaying a Web page having contents responding to instructions of each user. Namely, a dynamic Web page having unfixed contents can be provided to each user.

Utilizing this Java servlet having the above-mentioned feature, many providers have opened sites for providing services (such as on-line shopping or information search) by Web to network users.

These providers should design a structure for performing application processes (such as user authentication, selection of goods, accounting and searching) when opening sites utilizing the Java servlet, as well as a Web page. Since a lot of labor is required for these works, they usually ask programmers who are capable of Java programming to make the business logic and the control logic, and also ask Web designers to make the screen generation logic.

Programmers and Web designers should make these logic with Java codes or JSP (Java Server Pages) so that these logic work on a servlet engine.

In order to carry out the work utilizing Java efficiently, a technique is proposed for defining each screen and a servlet by one to one relationship as described in Japanese unexamined patent publication No. 2001-344105.

However, since a high technology skill is required for the work utilizing Java or JSP, creation and modification of the screen generation logic are still very difficult for Web designers even if the technique described in the above-mentioned document is utilized.

Accordingly, after opening a site, a lot of hours may be consumed for updating Web pages in the site so that update of Web pages may be delayed. Otherwise, the program may contain bugs so that smooth management of the site becomes difficult.

SUMMARY OF THE INVENTION

An object of the present invention is to provide a Web server and a method for modifying a design of a Web page that even an unskilled Web designer who is not familiar with Java can modify easily in an environment with a Web server utilizing a Java servlet.

A Web server according to the present invention has a function of a Java servlet and stores a Java program that performs a process of generating an HTML file of a Web page for a display on a terminal device of a network user. The Web server comprises an obtaining portion for obtaining an HTML file of a Web page from a terminal device of a person who has created or modified the Web page, a first conversion portion for converting the obtained HTML file of the Web page into Java codes, a program updating portion for updating the Java program by replacing the converted Java codes of the obtained HTML file of the Web page with a part of the Java program related to a structure of the Web page, an extraction portion for extracting Java codes of a part related to a structure of a designated Web page from the Java program, a second conversion portion for converting the extracted Java codes into an HTML file, and a transmission portion for transmitting the converted HTML file to the terminal device that made the designation. If the obtained HTML file contains a tag indicating a part that cannot be modified, the first conversion portion converts the tag into a Java code indicating a part that cannot be modified. The second conversion portion converts the code contained in the extracted Java codes into the tag.

Preferably, the Java program includes business logic for performing a process of an operation for one Web page and screen generation logic for generating an HTML source code of the part related to the structure of the Web page, and the first conversion portion converts the tag contained in the obtained HTML file into a Java code having a function of receiving a result of the operation by the business logic.

Alternatively, if the HTML file obtained by the obtaining portion contains a path of another file, a path memory portion for memorizing a path name of the path as path information and a path update portion for updating the path name are provided. The second conversion portion converts the part of the extracted Java codes indicating the path of another file into an HTML file in accordance with the path information memorized in the path memory portion.

In the present invention, "Java codes" means Java byte codes (intermediate codes) that are obtained by compiling Java source codes or the source codes.

BRIEF DESCRIPTION OF THE DRAWINGS

FIG. 5 shows an example of source codes of an HTML.

FIG. 6 shows an example of Java source codes.

FIG. 15 shows an example of modification of the HTML source codes shown in FIG. 13A.

DESCRIPTION OF THE PREFERRED EMBODIMENTS

Hereinafter, the present invention will be explained more in detail with reference to embodiments and drawings.

Figure 1:
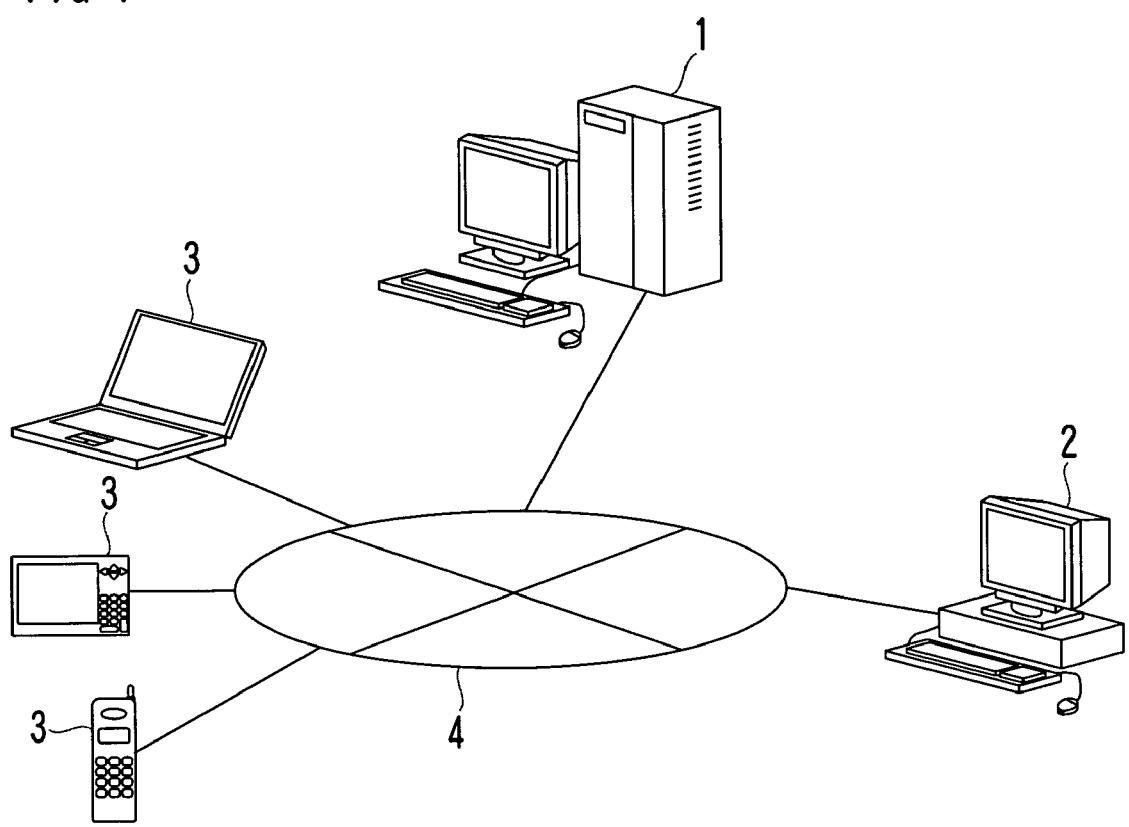
FIG. 1 shows an example of a network system including a Web server according to the present invention.
Figure 2:
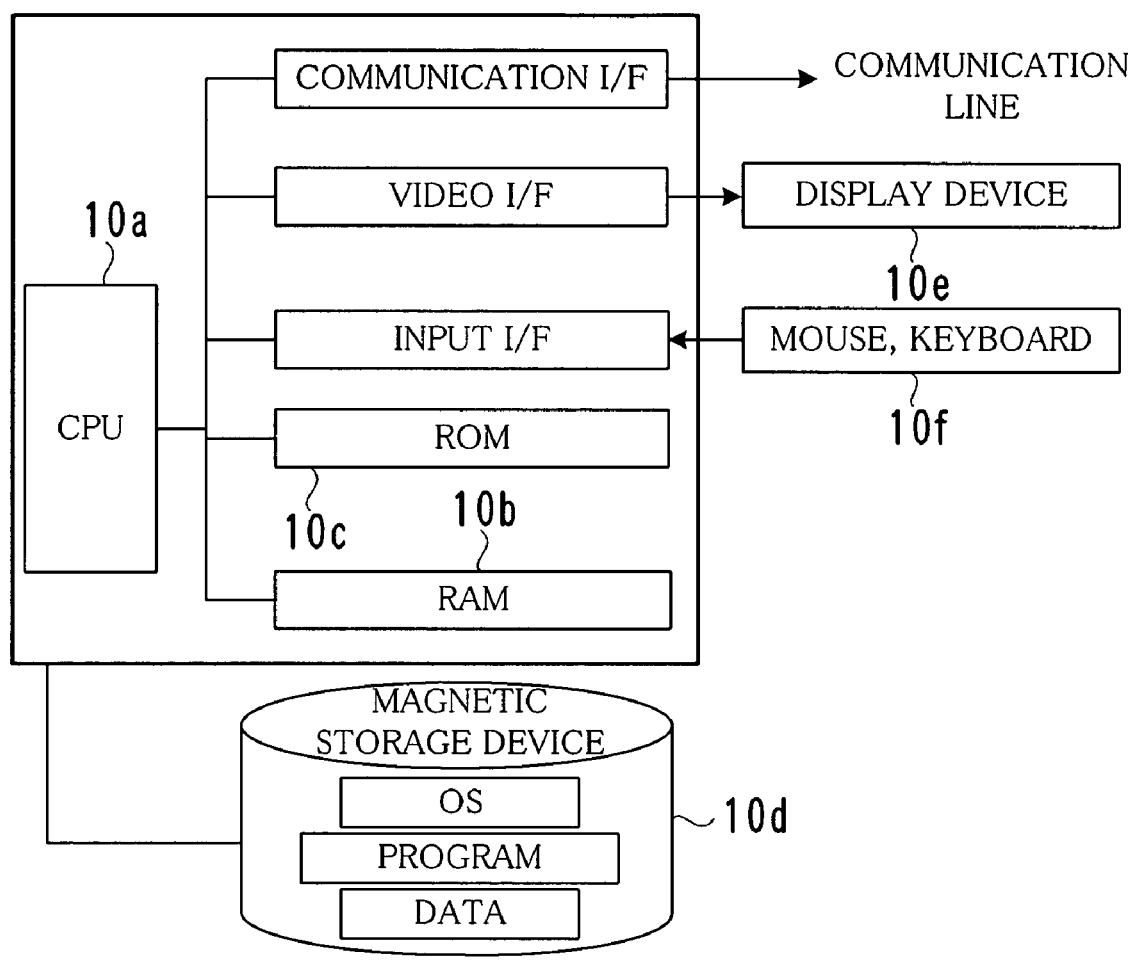
FIG. 2 shows an example of a hardware structure of the Web server.
Figure 3:
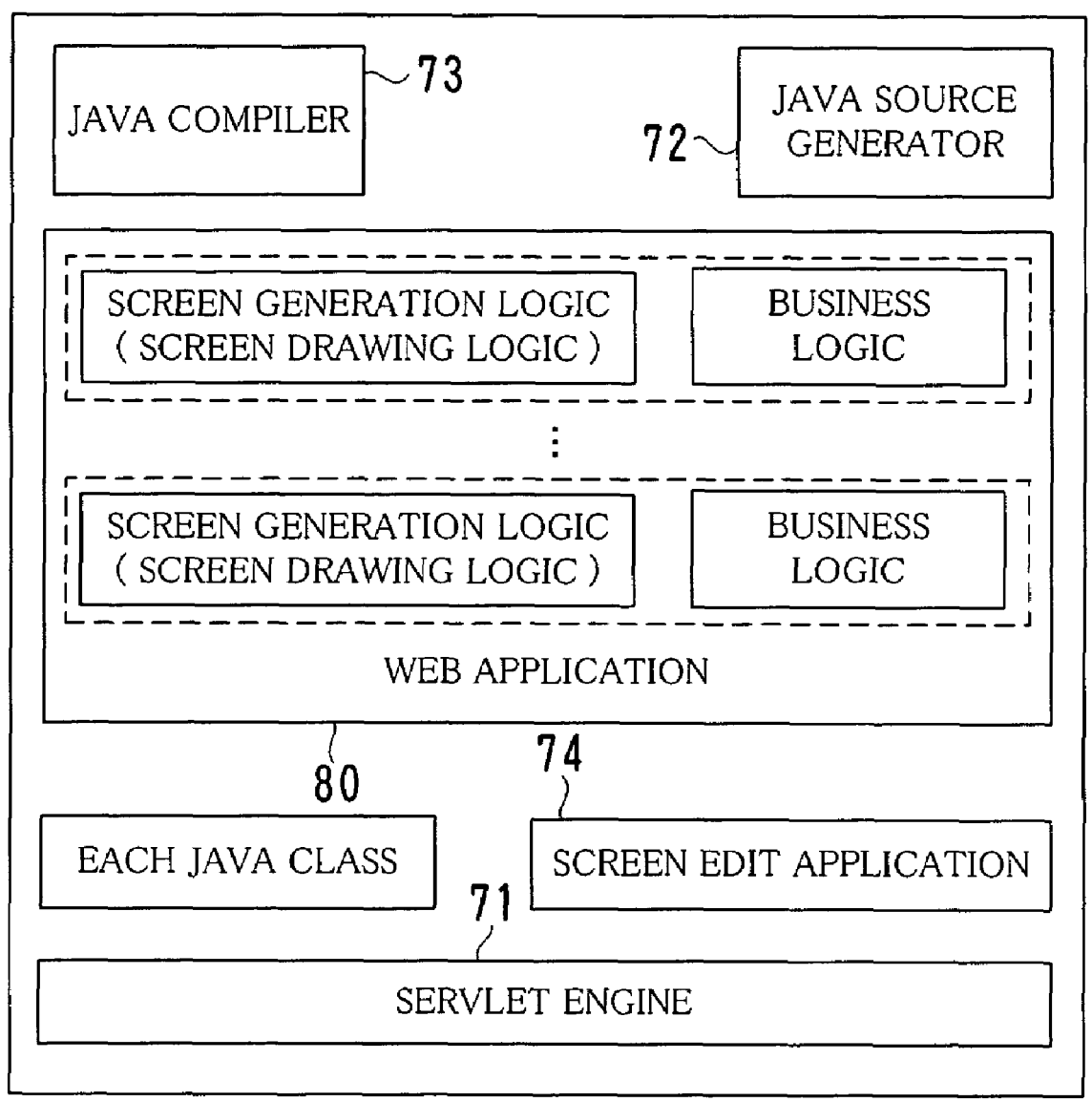
FIG. 3 shows an example of a program of the Web server.
Figure 4:
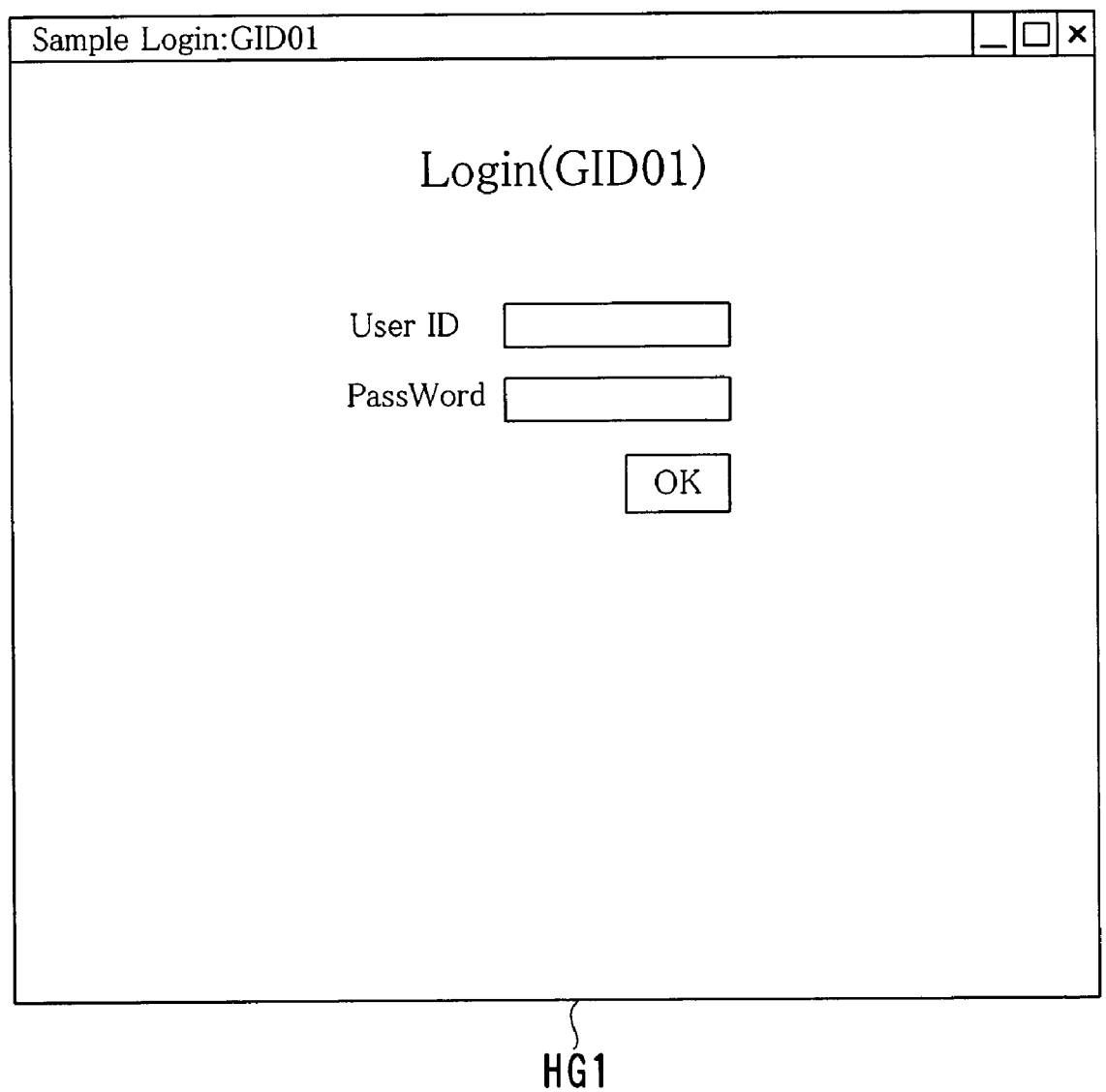
FIG. 4 shows an example of a login screen.
Figure 7:
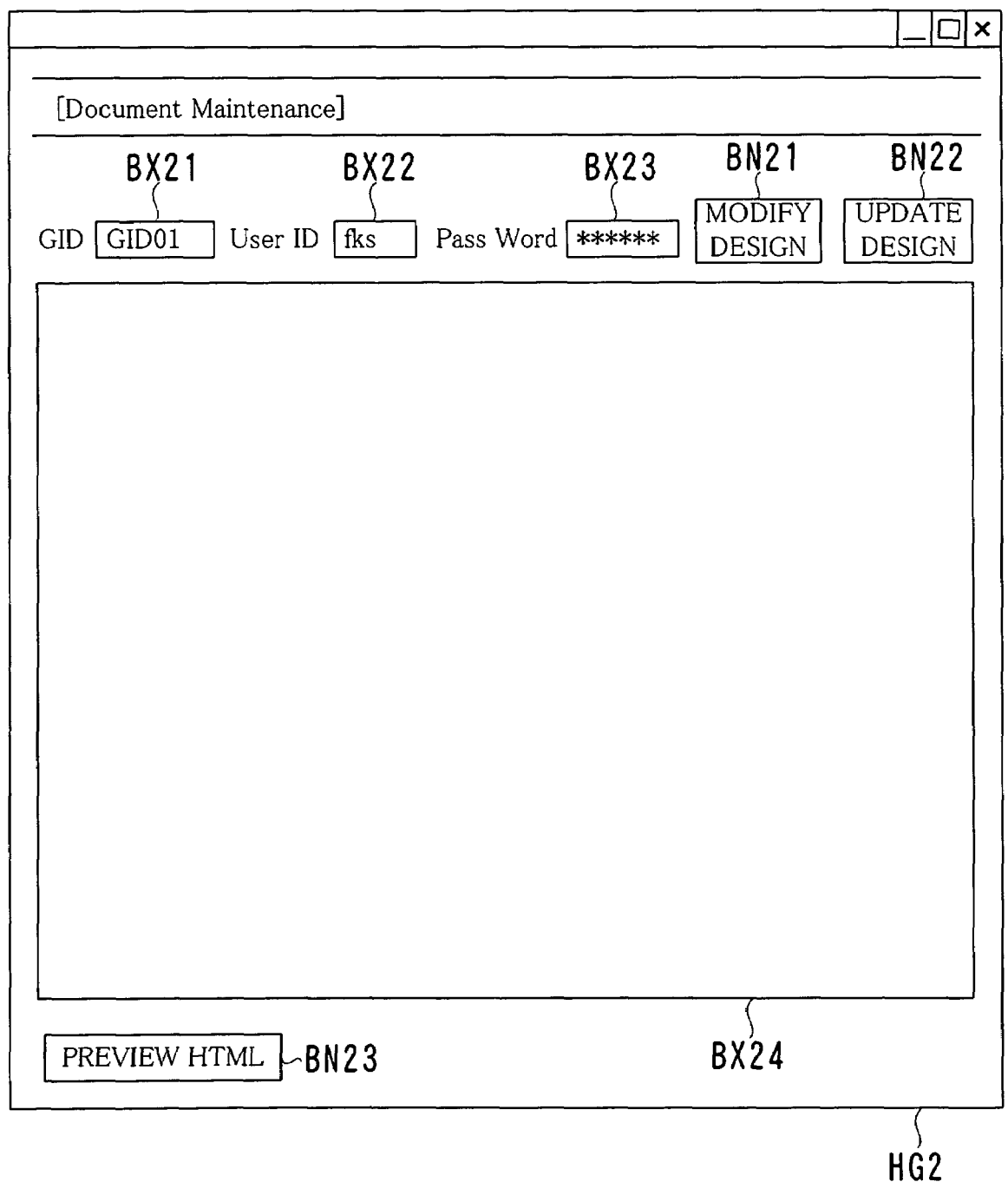
FIG. 7 shows an example of a Web page modification screen in an initial state.
Figure 8:
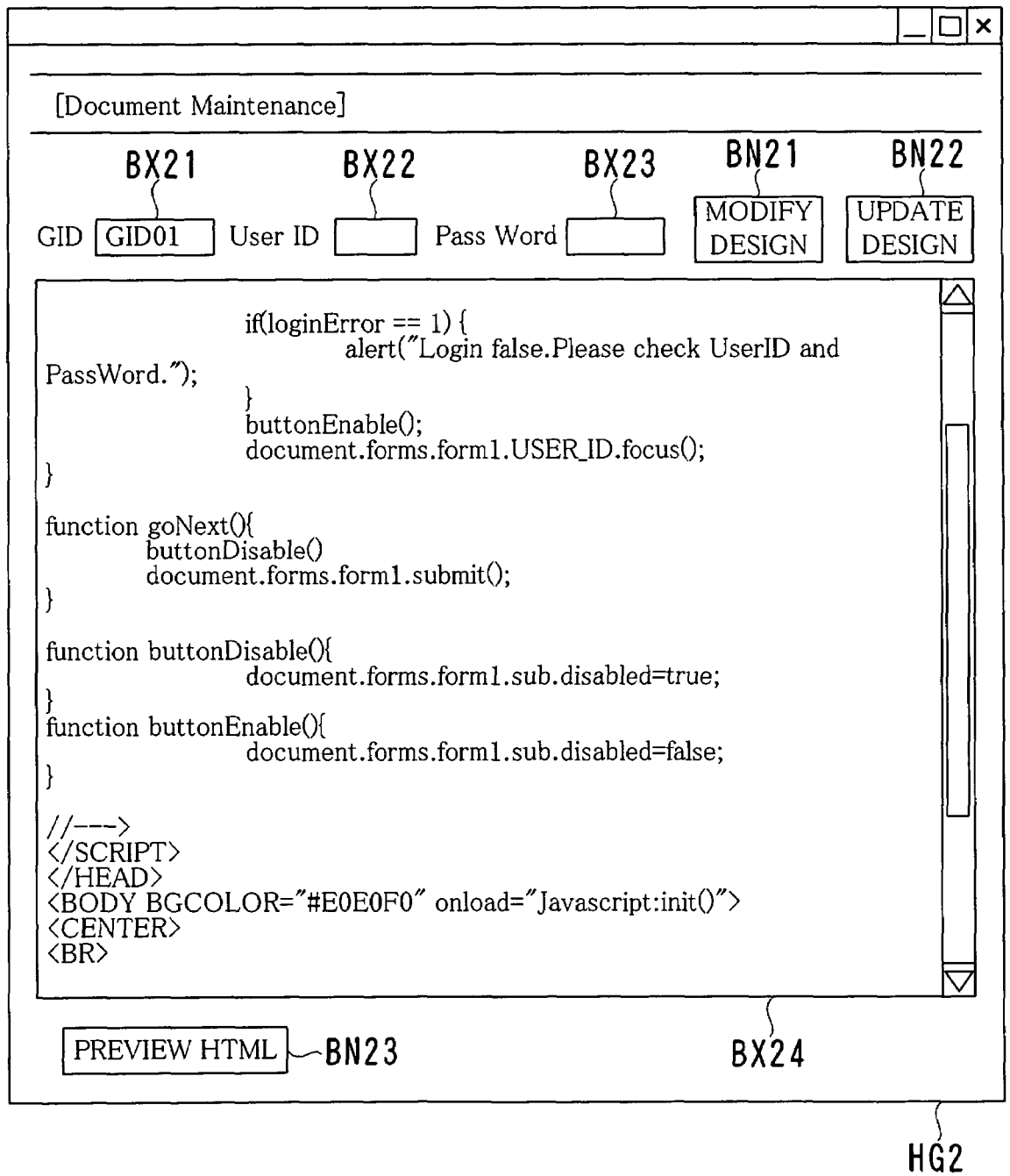
FIG. 8 shows an example of the Web page modification screen in which HTML source codes are displayed.
Figure 9:
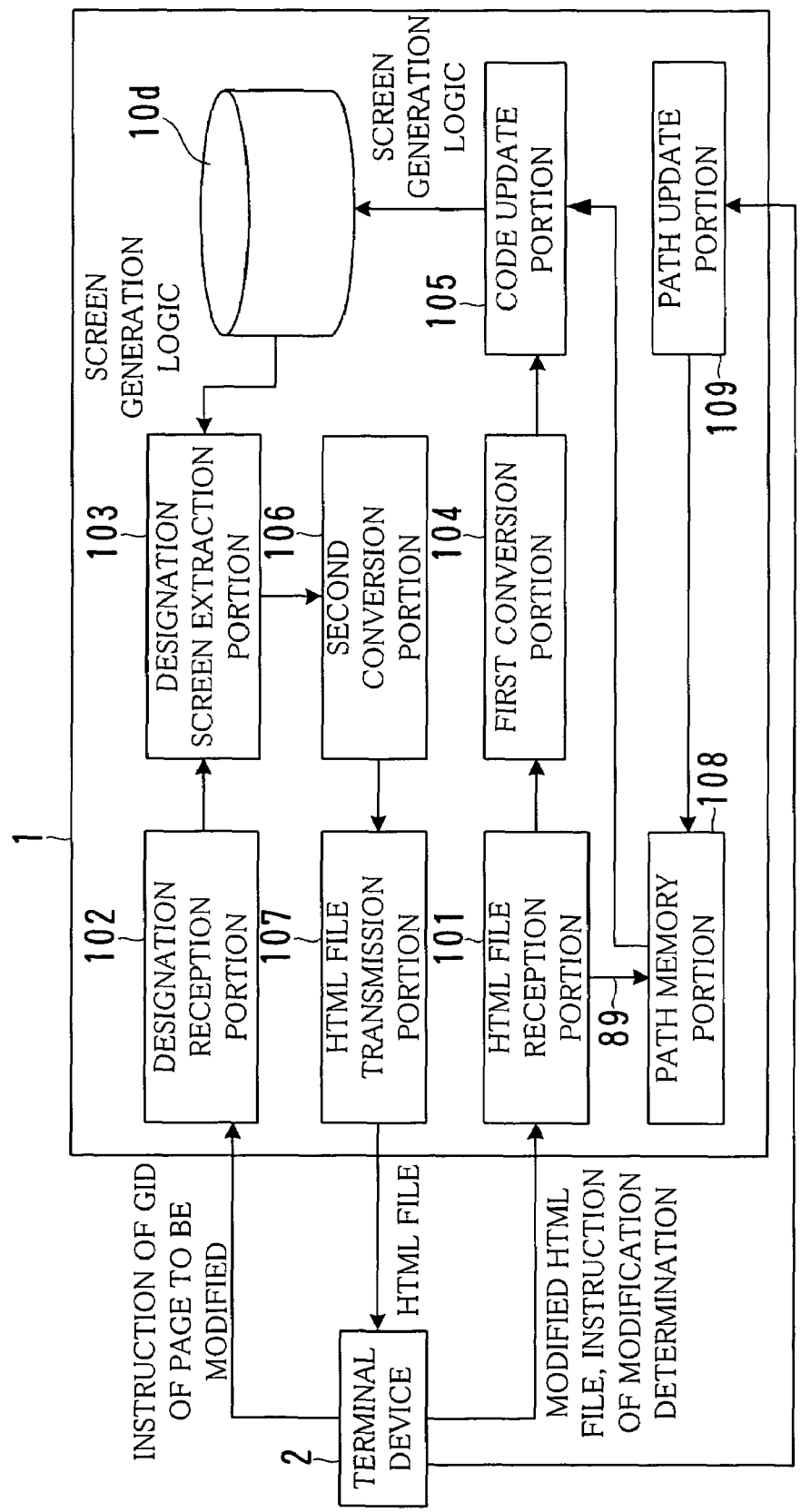
FIG. 9 shows an example of a functional structure of a Web server.
Figure 10:
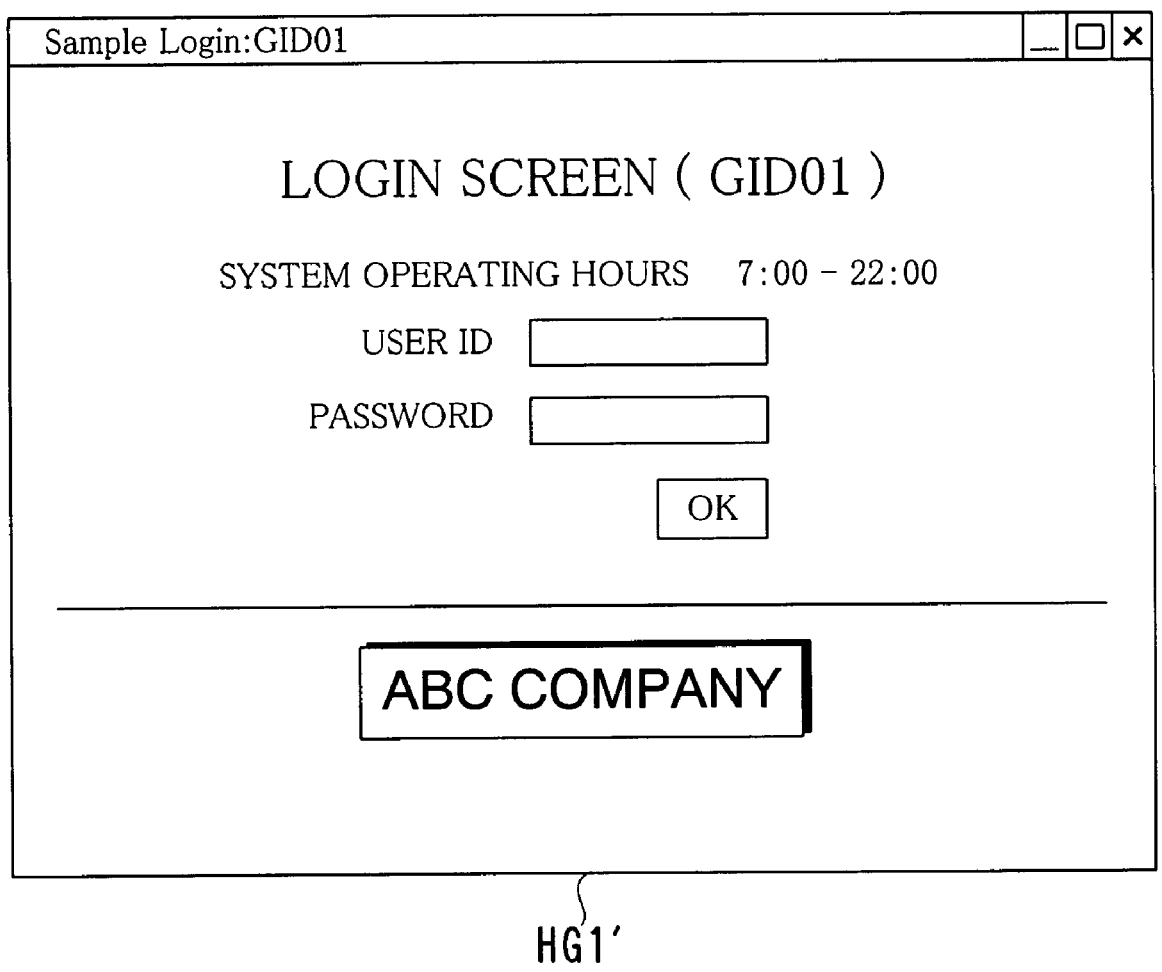
FIG. 10 shows the login screen after editing.
Figure 11:
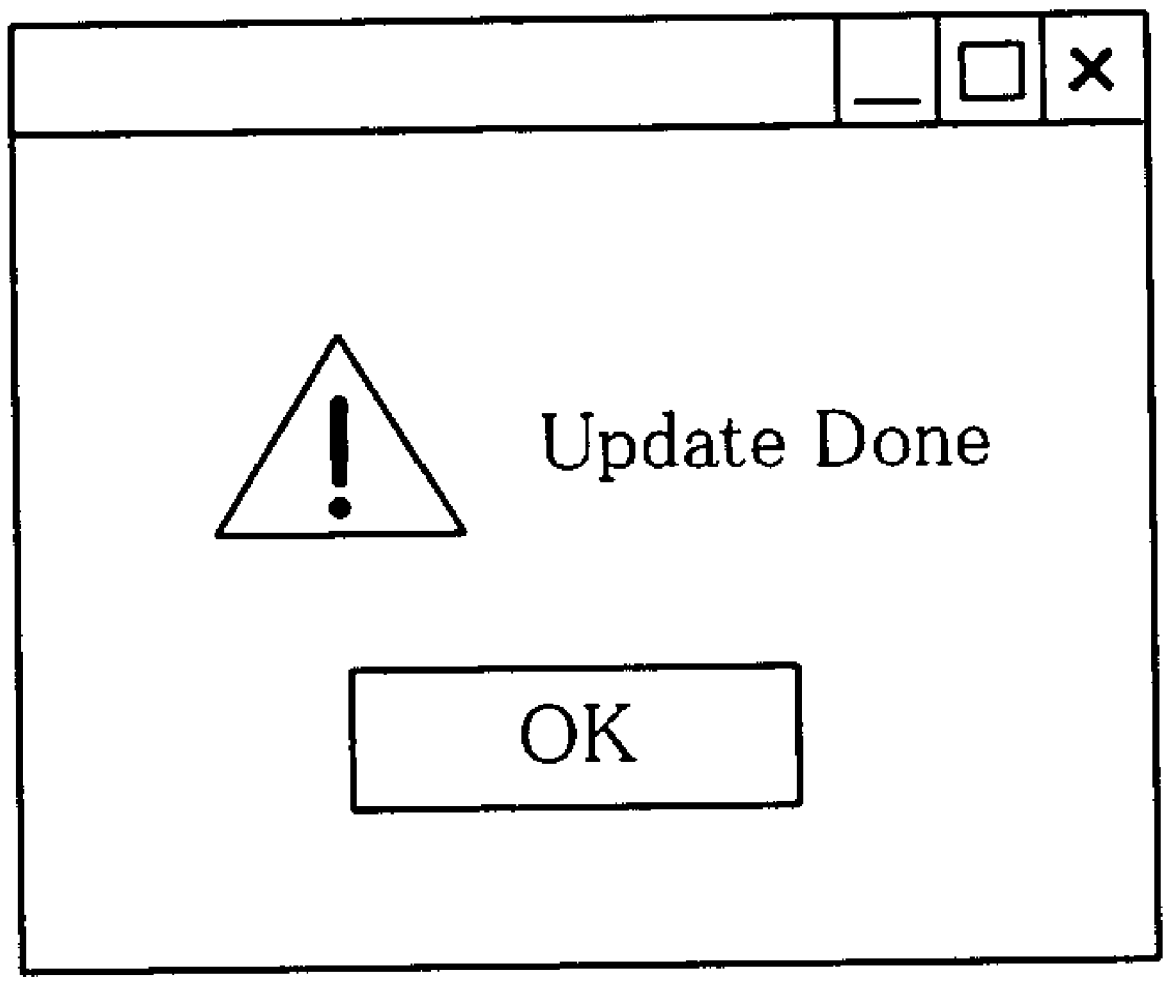
FIG. 11 shows a screen with a message that indicates completion of update.

FIG. 1 shows an example of a network system including a Web server 1 according to the present invention. FIG. 2 shows an example of a hardware structure of the Web server 1. FIG. 3 shows an example of a program of the Web server 1. FIG. 4 shows an example of a login screen HG1. FIG. 5 shows an example of source codes of HTML. FIG. 6 shows an example of Java source codes. FIG. 7 shows an example of a Web page modification screen HG2 in an initial state. FIG. 8 shows an example of the Web page modification screen HG2 in which HTML source codes are displayed. FIG. 9 shows an example of a functional structure of the Web server 1. FIG. 10 shows a login screen HG1' after editing. FIG. 11 shows a screen with a message that indicates completion of update.

A Web server 1 according to the present invention is connected to terminal devices 2 and 3 via a network 4 as shown in FIG. 1. The network 4 can be the Internet, a private line or a public line.

The terminal device 3 may be a personal computer owned by an ordinary user, a workstation, a personal digital assistant (PDA) or a cellular phone. The terminal device 3 has a function of a WWW browser (a World Wide Web browser) and obtains an HTML (Hypertext Markup Language) file from the Web server 1 or others, so as to browse Web pages describing various types of information and to utilize Web applications of various services such as information search, on-line shopping, auction or on-line banking.

The terminal device 2 is used for making or editing a Web page that is used for providing these services. For example, the terminal device 2 is used for inserting an illustration corresponding to the season in a Web page or for correcting a literal error when it is found. The terminal device 2 can be a personal computer or a workstation in which the WWW browser is installed, for example.

The Web server 1 includes a CPU 10a, a RAM 10b, a ROM 10c, a magnetic storage device 10d, a display device 10e and an input device 10f such as a mouse or a keyboard as shown in FIG. 2.

The magnetic storage device 10d stores an operating system (OS) and programs for realizing a Web application by a Java servlet as shown in FIG. 3. These programs are loaded on the RAM 10b and executed by the CPU 10a.

The servlet engine 71 corresponds to a Java virtual machine (JVM) in the Java servlet. The servlet engine is called a servlet container in the servlet API2.2 or later.

A Java source generator 72 is an HTML-to-Java conversion tool that generates a Java source code in accordance with source codes described in HTML. A Java compiler 73 compiles the Java source code into a Java class (a class file) that is a Java byte code that can be executed by the servlet engine 71.

A Web application 80 is a program for providing a service to the terminal device 3 and includes a plurality of Java classes (servlet classes). These Java classes include a Java class for each screen (each Web page) such as a login screen HG1 shown in FIG. 4, for example. The Java class of a screen includes a screen generation logic class for realizing screen generation (drawing) logic and an business logic class for realizing business logic. Basically, one screen generation logic class and one business logic class are prepared for one screen. Otherwise, it can be structured that one Java class includes the screen generation logic and the business logic.

The business logic performs a predetermined operation process in accordance with an operation or others in the terminal device 3. For example, user authentication is performed in accordance with a user ID and a password that were entered in the login screen HG1 displayed on the terminal device 3. The screen generation logic performs a process for generating an HTML file of a screen (a Web page). The business logic and the screen generation logic are associated with each other in their process flow. For example, the screen generation logic generates an HTML file in accordance with a result of the process performed by the business logic.

The screen generation logic is generated by the following procedure. First, coding of a part to be a base of the screen generation logic is made in HTML as shown in FIG. 5. The coded source code is converted into a Java source code by the Java source generator 72 as shown in FIG. 6. Then, the Java source code is compiled into a Java byte code by the Java compiler 73 to obtain the screen generation logic.

The HTML source code can include an original tag according to the present invention that indicates a part that must not be rewritten when modifying (upon maintenance of) the HTML source code. This tag is referred to as an "X tag" hereinafter.

The X tag is used as "<X name=" . . . "> . . . </X>" or "<X= . . . =X>". For example, when a value that is stored as a variable "USER_ID" is used for a default value in a text box of an ordinary user ID (a value indicated by value= . . . ) in the login screen HG1 shown in FIG. 4, the code is described as "<INPUT type="text" name="USER_ID" value="USER_ID">". In order to express that the part of the default value cannot be modified, it may be described as "<INPUT_type="text"name="USER_ID" value="<X=USER_ID"=X>>". In this way, the X tag can be used for a dynamic part of an HTML source. The "dynamic part" means a part of a screen design (a character, an image or others) that has different display contents responding to a result of a process performed by the business logic. The process for the X tag will be explained later.

On the other hand, the business logic is obtained by compiling the Java source code that was coded by a programmer by the Java compiler 73.

The magnetic storage device 10d also stores an edit application 74 for editing (maintenance of) the screen generation logic in the terminal device 2 of a Web designer as shown in FIG. 3. According to the edit application 74, maintenance of a Web page (an HTML file) can be performed by the terminal device 2 on the Web page modification screen HG2 shown in FIG. 7 or 8, for example. The edit application 74 includes the screen generation logic and the business logic and works on the servlet engine of the Web server 1.

According to this structure, an HTML file reception portion 101, a designation reception portion 102, a designation screen extraction portion 103, a first conversion portion 104, a code update portion 105, a second conversion portion 106, an HTML file transmission portion 107, a path memory portion 108 and a path update portion 109 are realized in the Web server 1 as shown in FIG. 9. These functions enable modification to a design of a Web page for a service provided to each user (e.g., the login screen HG1 shown in FIG. 4). Hereinafter, these functions will be explained.

When a predetermined URL is designated in the WWW browser of the terminal device 2, the Web page modification screen HG2 shown in FIG. 7 is displayed in accordance with the HTML file obtained from the Web server 1. Here, the Web designer enters an ID of a Web page to be modified (hereinafter referred to as "GID"), a user ID of the Web designer and a password in the text boxes BX21-BX23, respectively, and then clicks a modification button BN21. For example, if the login screen HG1 shown in FIG. 4 is to be modified, "GID01" is entered as the GID. When the modification button BN21 is clicked, the entered GID, user ID and password are transmitted to the Web server 1.

The designation reception portion 102 shown in FIG. 9 performs authentication, i.e., security check whether or not the user (the Web designer) of the terminal device 2 is an authorized user in accordance with the user ID and the password obtained from the terminal device 2. When the authentication is completed with a result of an authorized user, the designation of the GID is accepted, and the GID is passed to the designation screen extraction portion 103.

The designation screen extraction portion 103 extracts the Java byte code of the screen generation logic corresponding to the passed GID from the magnetic storage device 10d. The second conversion portion 106 converts the extracted Java byte code into an HTML source code. The HTML file transmission portion 107 transmits an HTML file for displaying a screen for modifying the converted HTML source code to the terminal device 2.

On this occasion in the terminal device 2, the HTML source code received from the Web server 1 is displayed in the text box BX24 of the Web page modification screen HG2 as shown in FIG. 8. The Web designer can modify the design of the Web page by changing the HTML source code. When a preview button BN23 is clicked, a login screen HG1' as shown in FIG. 10 is displayed (previewed) in the WWW browser in accordance with the modified HTML source code. The Web designer can check the quality of the modification. When an update button BN22 is clicked after going back to the Web page modification screen MG2, the modified HTML source code is transmitted to the Web server 1.

When the HTML file reception portion 101 shown in FIG. 9 receives the modified HTML source code in the Web server 1 the first conversion portion 104 converts the HTML source code Into the Java source code, which is compiled into the Java byte code.

The code update portion 105 overwrites the converted Java byte code on the original Java byte code, so that the codes of the screen generation logic are updated (replaced). On this occasion, a message as shown in FIG. 11 Indicating completion of the update of the screen generation logic class is displayed on the terminal device 3.

Figures 12, 13A, 13B:
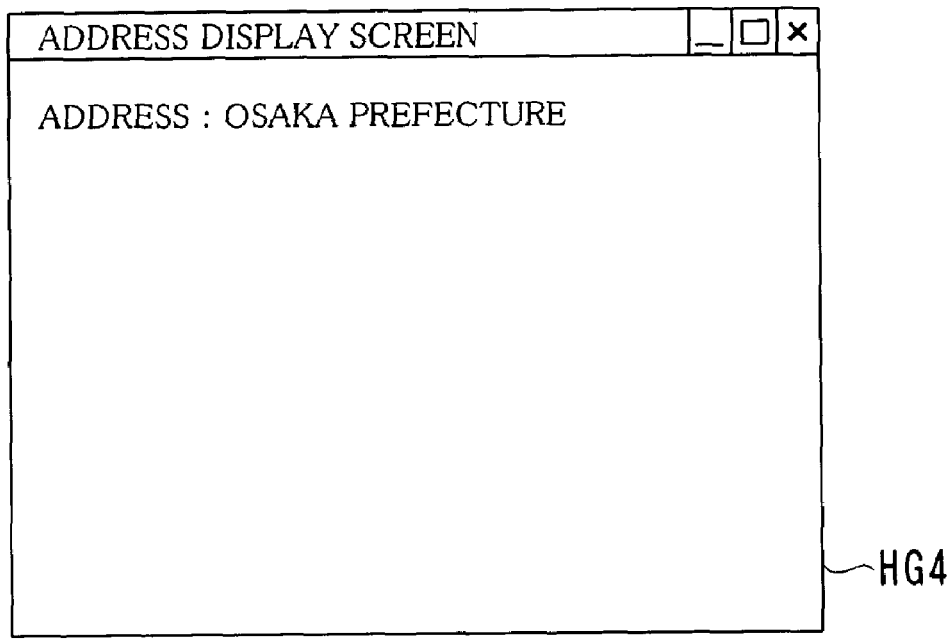
FIG. 12 shows an example of a screen (a Web page).
FIGS. 13A and 13B show examples of HTML source codes for the screen shown in FIG. 12.
Figure 14:
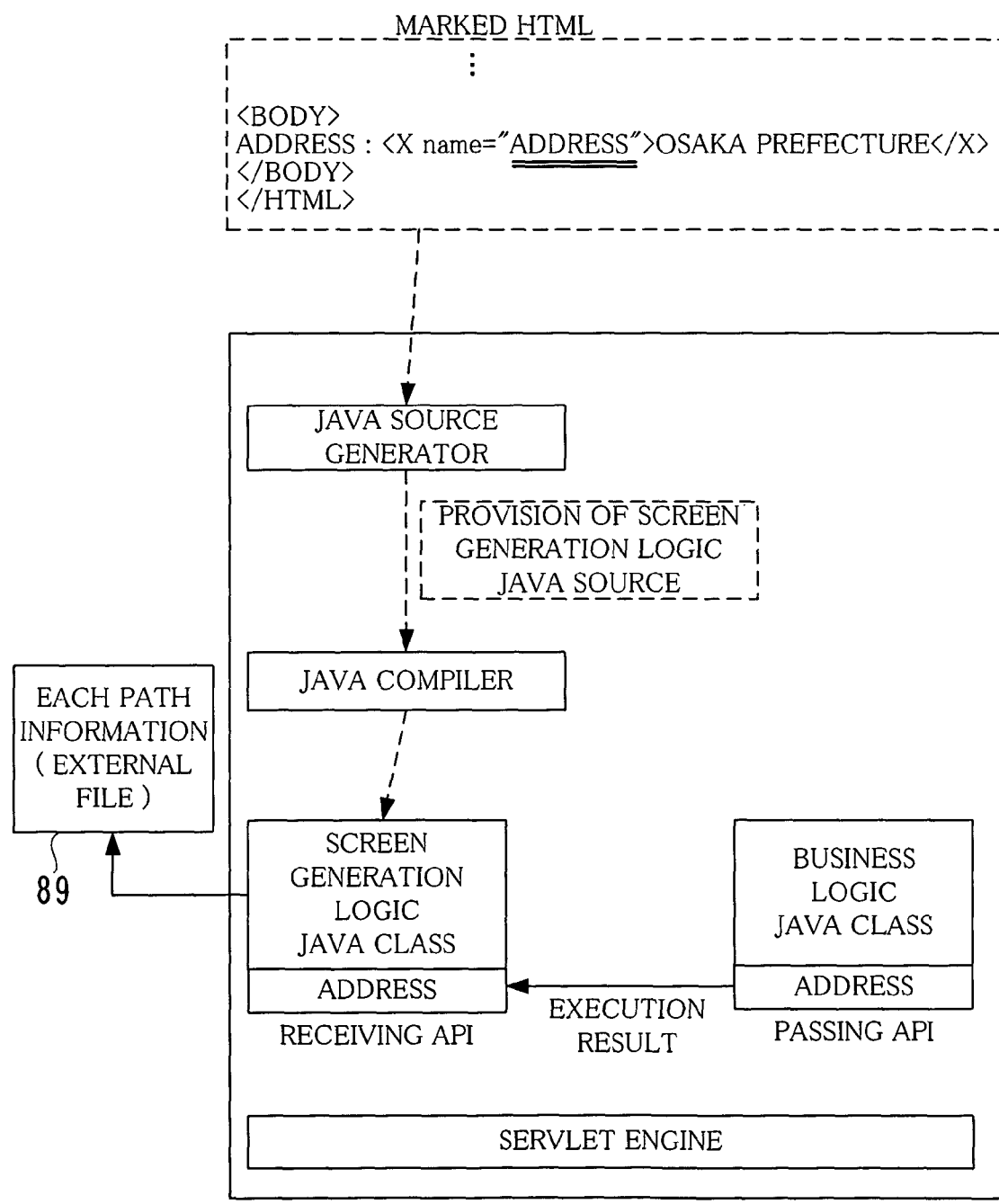
FIG. 14 is a diagram for explaining a function of the X tag in the business logic and the screen generation logic.

FIG. 12 shows an example of a screen HG4 (a Web page). FIGS. 13A and 13B show examples of the HTML source code for the screen HG4 shown in FIG. 12. FIG. 14 is a diagram for explaining a function of the X tag in the business logic and the screen generation logic. FIG. 15 shows an example of modification of the HTML source code shown in FIG. 13A.

Next, the code conversion between HTML and Java together with a process of the X tag in the HTML will be explained. As explained above, the Web designer creates a web page and does maintenance thereof using the HTML. For example, when creating a Web page (the screen HG4) shown in FIG. 12, the HTML source code is described as shown in FIG. 13A. In order to handle the part of the character string "OSAKA PREFECTURE" in the screen HG4 as a dynamic part, the X tag is used. Namely, the part of "OSAKA PREFECTURE" is marked with the X tags as shown in FIG. 13B.

The first conversion portion 104 shown in FIG. 9 converts an HTML source code into a Java source code in accordance with the following rules.

(a) A part that is not marked with the X tag is converted into a code that works so that the screen described in the HTML source code is displayed without any change.

(b) A part that is marked with the X tag is converted into a code "getHTML" that works so as to receive a value from the business logic in accordance with a marking name (a value indicated by name= . . . ) when performing the screen generation logic generated on the basis of the HTML source code (see FIGS. 5 and 6). For example, in the case of "<X name="ADDRESS">OSAKA PREFECTURE</X>" contained in the source code shown in FIG. 13B, it is converted into a code that works so as to obtain a result of performing the business logic via a variable named "ADDRESS" as shown in FIG. 14.

(c) A part that becomes a URL (a path) of an image or a URL of a submission destination is converted into a code that works so that the URL can be read from an external file dynamically. Namely, the coding is performed as follows, for example. The path memory portion 108 shown in FIG. 9 extracts a URL of an image or others contained in the HTML source code obtained from the terminal device 2 and memorizes a part thereof except for the file name, i.e., a path name as path information 89. For example, if the HTML source code contains a description "src="/test1/images/gazou.gif", the part "/test1/images/" is memorized as the path information 89 in the external file. The first conversion portion 104 replaces the part of the path name of the URL contained in the HTML source code with a character string for distinguishing the path information 89 and converts the same into a Java source code.

According to these rules, the converted Java source code is compiled into a Java byte code, which is stored under an environment of Java servlet operation. In this way, the HTML source code of the image generation logic is converted into a Java byte code.

As explained above, a programmer has to describe the business logic as a Java source code. In addition, the business logic that is associated with the screen generation logic has to be coded so that data can be transferred between the business logic and the screen generation logic. For example, in the case shown in FIG. 14, the function of delivering (setting) a value by "ADDRESS" has to be provided to the business logic.

On the other hand, if the Java byte code of the image generation logic contains a code corresponding to "getHTML", the second conversion portion 106 shown in FIG. 9 converts it into an HTML source code so that the part becomes the X tag.

In addition, a part corresponding to a URL (a path) of an image or others is converted into HTML in accordance with the path information 89. Therefore, the URL contained in the HTML source code obtained from the terminal device 2 is not always restored without any change but can be converted into a different URL.

For example, it is supposed that the HTML source code obtained from the terminal device 2 in a test stage contains a URL "/test1/images/gazou.gif" of an image. Then, the path name "/test1/images/" is obtained as the path information 89. Furthermore, it is supposed that the path update portion 109 shown in FIG. 9 rewrites the path information 89 into "/honban/images/" in accordance with an operation of a system administrator when moving to a production environment. When converting the Java byte code into the HTML source code, the URL of the image becomes "/honban/images/gazou.gif". In this way, even if a lot of URLs of images are contained in the same hierarchical level, it is easy to change dynamically to the production environment or to a URL of the next test stage as the path information 89 contained in the external file can be changed.

The HTML source code obtained as explained above is transmitted to the terminal device 2 by the HTML file transmission portion 107 and modified by the Web designer as shown in FIG. 15, for example. The modified source code is compiled again by the first conversion portion 104 to be the Java byte code, which is replaced with the original screen generation logic.

Figure 16:
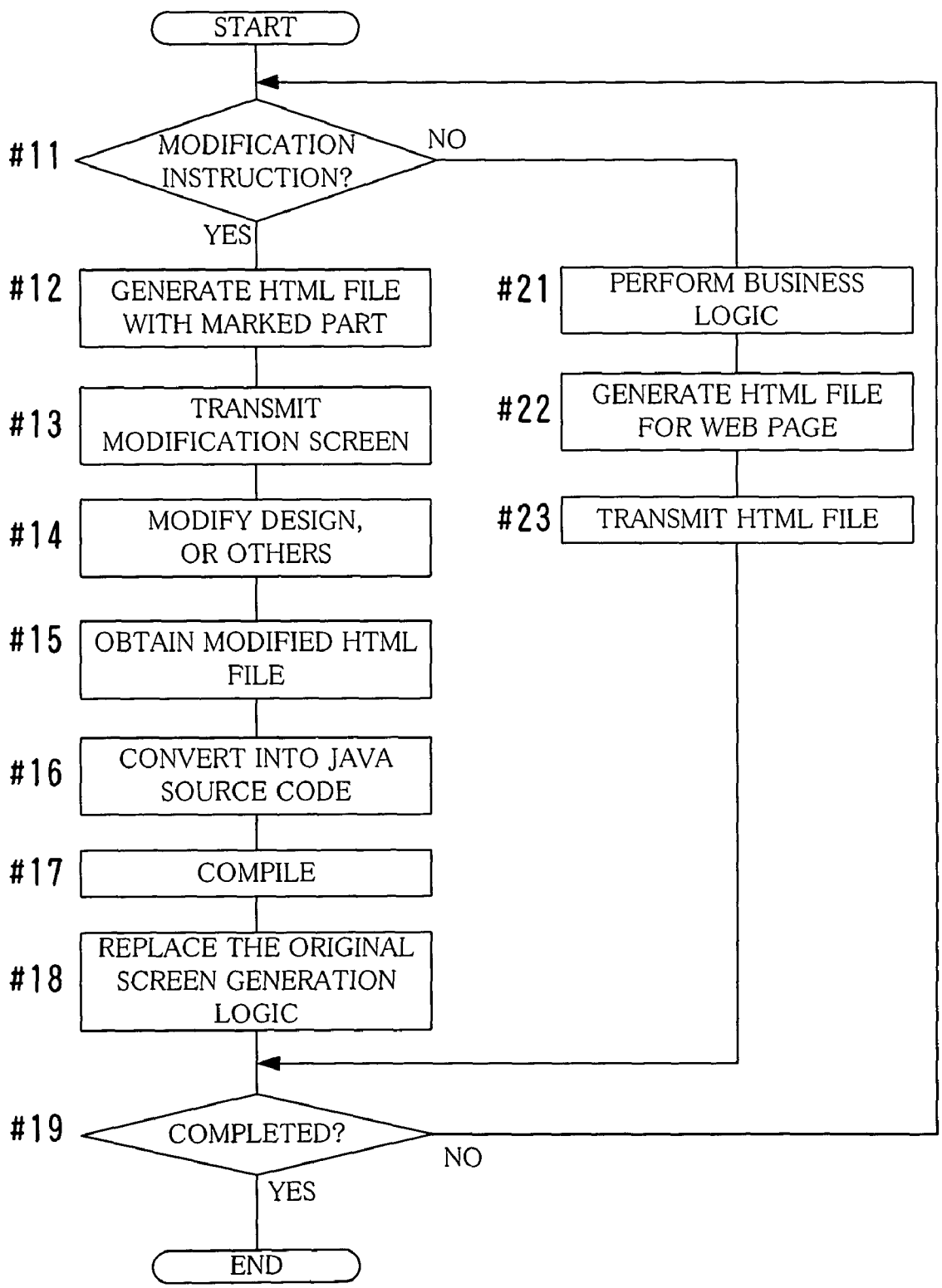
FIG. 16 is a flowchart that explains a process flow in the Web server.
Figure 17:
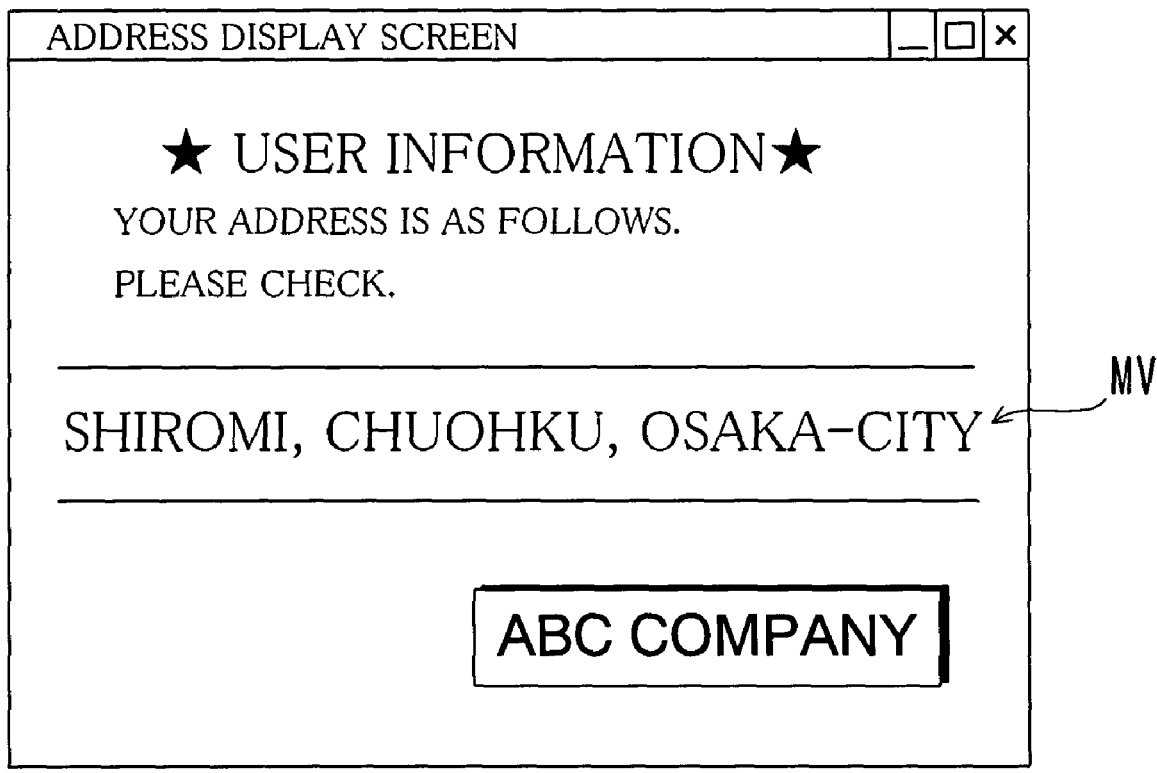
FIG. 17 shows an example of a screen (a Web page).

FIG. 16 is a flowchart that explains a process flow in the Web server 1. FIG. 17 shows an example of a screen HG5 (a Web page). Next, a process flow of the Web server 1 when being accessed from the terminal device 2 or the terminal device 3 will be explained with reference to the flowchart shown in FIG. 16.

When there is an instruction from the terminal device 2 to modify a design of a Web page (Yes in #11), a Java byte code of the screen generation logic corresponding to the designated screen ID (GID) is extracted, and an HTML file with a part "getHTML" marked with the X tag in accordance with the Java byte code is generated (#12). Then, an HTML file for the Web page modification screen HG2 as shown in FIG. 8 is transmitted to the terminal device 2 (#13).

In the terminal device 2 on which the Web page modification screen HG2 is displayed, the Web designer modifies (edits) the HTML source code in the text box BX24 carefully not to rewrite the part of the X tag (#14). For example, a part of the source code shown in FIG. 13B except for the dynamic part indicated by the X tag, i.e., a part having a fixed or a static design is modified to make a source code as shown in FIG. 15. The modified source code is transmitted to the Web server 1 (#15) and converted into a Java source code (#16). Further, it is compiled into a Java byte code (#17). Then, it replaces the original Java byte code, and thus the modification of the Web page design is completed. After the completion of the modification, it is confirmed that a login authentication function works correctly.

On the other hand, if there is an access from the terminal device 3 (No in #11), the business logic is performed first (#21). Next, the screen generation logic works in accordance with a result of the operation by the business logic, so that an HTML file is generated (#22). For example, if the result of the operation by the business logic is "SHIROMI, CHUO-HKU, OSAKA-CITY", an HTML file for displaying the screen HG5 is generated so that the dynamic part MV becomes "SHIROMI, CHUOHKU, OSAKA-CITY" as shown in FIG. 17. Then, the generated HTML file is transmitted to the terminal device 3 (#23).

The process of steps #12-#18 and #21-#23 is repeated as appropriate every time when there is an access from the terminal device 2 or 3.

According to this embodiment, even an unskilled person who is not familiar with Java can modify easily a screen design of a Web application provided by a Java servlet. In addition, since the modification can be performed on a WWW browser, it is not required to prepare an FTP (File Transfer Protocol) application or a compiler in the terminal device 2.

By using the X tag, a bug can be prevented that may disturb association between the screen generation logic and the business logic. In addition, by storing a URL of an image file contained in the HTML source code as path information in an external file, labor for changing the URL can be reduced when moving from a test environment to a production environment.

It is possible to use plural X tags in one HTML source code. Though the second conversion portion 106 generates the HTML source code of the Web page to be modified by converting the Java byte source in the above embodiment, it can be generated by converting the Java source code.

A Web designer can modify an HTML source code by using an application program for making a Web page. It is possible to provide the application program for making a Web page with a function of adding a special mark indicating prohibition of modification in a part of the X tag.

The entire structure or a partial structure of the Web server 1, the terminal devices 2 and 3, the structure and contents of the program, contents and order of the process can be modified if necessary within the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A Web server that has a function of a Java servlet and stores a Java program that performs a process of generating an HTML file of a Web page for a display on a terminal device of a network user, the Web server comprising:

an obtaining portion obtaining an HTML file of a Web page from a terminal device of a person who modified the Web page;

a first conversion portion converting the obtained HTML file of the Web page into Java code;

a program updating portion updating the Java program by replacing the converted Java code of the obtained HTML file of the Web page with a part of the Java program related to a structure of the Web page;

an extraction portion extracting Java code of a part related to a structure of a designated Web page from the updated Java program;

a second conversion portion converting the extracted Java code into an HTML file; and a transmission portion transmitting the converted HTML file to the terminal device that made the designation, wherein if the obtained HTML file contains a tag indicating a part of the obtained HTML file that cannot be modified, the first conversion portion converts the tag into a corresponding Java code indicating the part that cannot be modified, and the second conversion portion converts the corresponding Java code indicating the part that cannot be modified, contained in the extracted Java code into the tag of the obtained HTML file containing the unmodified part.

2. A Web server according to claim 1, wherein the Java program includes business logic for performing a process of an operation for one Web page and screen generation logic for generating an HTML source code of the part related to the structure of the Web page, and the first conversion portion converts the tag contained in the obtained HTML file into the Java code having a function of receiving a result of the operation by the business logic.

3. A Web server according to claim 1, wherein if the HTML file obtained by the obtaining portion contains a path of another file, a path memory portion for memorizing a path name of the path as path information and a path update portion for updating the path name are provided, and the second conversion portion converts the part of the extracted Java code indicating the path of another file into an HTML file in accordance with the path information memorized in the path memory portion.

4. A method for updating a Java program in a Web server that has a function of a Java servlet and stores a Java program that performs a process of generating an HTML file of a Web page for a display on a terminal device of a network user, the method comprising:
  extracting Java code of a part related to a structure of a designated Web page from the Java program;
  converting the extracted Java code into an HTML file;
  transmitting the HTML file converted from the extracted Java code to the terminal device that made the designation;
  obtaining a modified HTML file from the terminal device that made the designation;
  converting the obtained HTML file into Java code; and
  updating the Java program by replacing the Java code converted from the obtained HTML file with a part of the Java program related to a structure of a Web page corresponding to the Java code, wherein
  when converting the obtained HTML file into the Java code, if the obtained HTML file contains a tag indicating a part of the obtained HTML file that cannot be modified, the tag is converted into corresponding Java code indicating the part that cannot be modified, and
  when converting the extracted Java code into the HTML file, the corresponding Java code indicating the part that cannot be modified, contained in the extracted Java code is converted into the tag of the obtained HTML file containing the unmodified part.

5. A computer-storage medium storing a program that is used for a computer that has a function of a Java servlet and stores an HTML generating program that performs a process of generating an HTML file of a Web page for a display on a terminal device of a network user, the computer program making the computer perform a process comprising:
  obtaining an HTML file of a Web page from a terminal device of a person who has modified the Web page;
  converting the obtained HTML file of the Web page into Java code;
  updating the HTML generating program by replacing the Java codes converted from the obtained HTML file of the Web page with a part of the HTML generating program related to a structure of the Web page;
  extracting Java code of a part related to a structure of a designated Web page from the updated HTML generating program;
  converting the extracted Java code into an HTML file; and
  transmitting the HTML file converted from the extracted Java code to the terminal device that made the designation, wherein
  when converting the obtained HTML file of the Web page into the Java code, if the obtained HTML file contains a tag indicating a part of the obtained HTML file that cannot be modified, the tag is converted into corresponding Java code indicating the part that cannot be modified, and
  when converting the extracted Java code into the HTML file, the corresponding Java code indicating the part that cannot be modified, contained in the extracted Java code is converted into the tag of the obtained HTML file containing the unmodified part.

* * * * *

UNITED STATES PATENT AND TRADEMARK OFFICE
CERTIFICATE OF CORRECTION

PATENT NO. : 7,305,657 B2 Page 1 of 1
APPLICATION NO. : 10/647310
DATED : December 4, 2007
INVENTOR(S) : Toru Noda It is certified that error appears in the above-identified patent and that said Letters Patent is hereby corrected as shown below:

Column 10, Line 14, change "codes" to --code--.

Signed and Sealed this

Twentieth Day of May, 2008

JON W. DUDAS
*Director of the United States Patent and Trademark Office*